US007818561B2

(12) United States Patent
Erickson et al.

(10) Patent No.: US 7,818,561 B2
(45) Date of Patent: Oct. 19, 2010

(54) SENDING SERVICE DATA TO AN RFID TAG WHILE AN ATTACHED COMPUTER SYSTEM IS POWERED OFF

(75) Inventors: Steven C. Erickson, Rochester, MN (US); Ivory Wellman Knipfer, Rochester, MN (US); Jeffrey George Komatsu, Kasson, MN (US); Fraser Allan Syme, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 11/977,848

(22) Filed: Oct. 25, 2007

(65) Prior Publication Data

US 2008/0055090 A1 Mar. 6, 2008

Related U.S. Application Data

(62) Division of application No. 11/272,592, filed on Nov. 10, 2005, now Pat. No. 7,450,008.

(51) Int. Cl.
*G06F 1/24* (2006.01)
*G06F 9/00* (2006.01)
*G08B 13/14* (2006.01)

(52) U.S. Cl. .................................. 713/100; 340/572.1
(58) Field of Classification Search .............. 713/100; 340/572.1, 572.7, 572.8
See application file for complete search history.

(56) References Cited

U.S. PATENT DOCUMENTS 5,864,580 A * 1/1999 Lowe et al. ................. 375/222

| 6,046,676 | A | 4/2000 | Ward et al. |
| 6,288,645 | B1 | 9/2001 | McCall et al. |
| 7,239,238 | B2 | 7/2007 | Tester et al. |
| 7,315,248 | B2 * | 1/2008 | Egbert ...................... 340/572.7 |
| 7,450,008 | B2 * | 11/2008 | Erickson et al. .......... 340/572.1 |
| 2005/0253725 | A1 * | 11/2005 | Neuwirth et al. ......... 340/572.8 |
| 2006/0091196 | A1 * | 5/2006 | Durham et al. ............. 235/375 |

OTHER PUBLICATIONS http://activewaveinc.com/products_datasht_prog_station.html, "Programming Station Datasheet", pp. 1-4, printed Nov. 9, 2005, date unknown.

* cited by examiner

*Primary Examiner*—Thomas Lee
*Assistant Examiner*—Brandon Kinsey
(74) *Attorney, Agent, or Firm*—Owen J. Gamon; Grant A. Johnson

(57) ABSTRACT

A method, apparatus, system, and signal-bearing medium that, in an embodiment, receive service data at a computer system from an RFID tag, where the service data was sent to the RFID tag from an RF transmitter while the computer system was powered off. The RFID tag includes tag memory and an antenna, and the RFID tag is attached to the computer system. In another embodiment, the computer system sends the service data to the RFID tag, and the service data is received by an RF scanner from the RFID tag via the antenna while the computer system is powered off. In various embodiments, the service data identifies the computer system or a product within the computer system. In another embodiment, the service data includes log information associated with the computer system. In this way, in an embodiment, service data associated with a computer system, such as vital product service data and log information may be accessed and updated even while the computer system is powered off.

19 Claims, 8 Drawing Sheets

SENDING SERVICE DATA TO AN RFID TAG WHILE AN ATTACHED COMPUTER SYSTEM IS POWERED OFF

CROSS REFERENCE TO RELATED APPLICATION

This is a divisional application of U.S. patent application Ser. No. 11/272,592, filed Nov. 10, 2005 now U.S. Pat. No. 7,450,008, to Steven C. Erickson, et al., entitled "SENDING SERVICE DATA TO AN RFID TAG WHILE AN ATTACHED COMPUTER SYSTEM IS POWERED OFF," which is herein incorporated by reference.

FIELD

This invention generally relates to computer systems and more specifically relates to sending and receiving service data to and from an RFID (Radio Frequency Identification tag) while an attached computer system is powered off.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs.

Users often have a need to determine the parts (the hardware and/or software) that a computer includes, e.g., in order to perform upgrades or diagnose problems. Unfortunately, determining the parts that a computer includes can be difficult for the following reasons. First, computers typically are composed of numerous parts, which may include hardware, software, and a combination of both. Second, these parts may change over time, e.g., a computer may be upgraded with an additional or a faster processor, a storage device may be replaced, or a hardware device that is encoded with software may receive a new version of the software while the hardware device that encodes the software remains exactly the same. Finally, many parts are not readily ascertainable via casual visual inspection. For example, memory chips can only be seen by removing the cover of the computer and extracting the card on which the chips are mounted, but even this visual inspection reveals nothing regarding the instructions that are encoded on the memory chip.

In order to address the aforementioned difficulties in determining information regarding parts, many computer systems use the concept of Vital Product Data (VPD), which is information about a computer system or product that is stored on a computer's hard disk, other non-volatile memory, or on the component itself, that allows the computer system or product to be identified, administered and/or managed. Typical VPD information includes a product model number, a unique serial number, a product release level, a maintenance level, and/or other information specific to the type of the product.

Currently, VPD may only be accessed, collected, or viewed via specialized programs, all of which require the computer to be powered and executing an operating system or program. Hence, accessing VPD impacts the operation of the computer system, which must be at least partially functional. But, at the time that the VPD is needed, e.g., for diagnosing an error or replacing a device, the computer system may not be functional or even powered on.

Thus, what is need to a better way to access vital product data. Although the aforementioned problems have been described in the context of VPD, they may also apply to other types of data, such as error logs.

SUMMARY

A method, apparatus, system, and signal-bearing medium are provided that, in an embodiment, receive service data at a computer system from an RFID (Radio Frequency Identification) tag, where the service data was sent to the RFID tag from an RF transmitter while the computer system was powered off. The RFID tag includes tag memory and an antenna, and the RFID tag is attached to the computer system. In another embodiment, the computer system sends the service data to the RFID tag, and the service data is received by an RF scanner from the RFID tag via the antenna while the computer system is powered off. In various embodiments, the service data identifies the computer system or a product within the computer system. In another embodiment, the service data includes log information associated with the computer system. In this way, in an embodiment, service data associated with a computer system, such as vital product data and log information may be accessed and updated even while the computer system is powered off.

BRIEF DESCRIPTION OF THE DRAWINGS

Various embodiments of the present invention are hereinafter described in conjunction with the appended drawings.

It is to be noted, however, that the appended drawings illustrate only example embodiments of the invention, and are therefore not considered limiting of its scope, for the invention may admit to other equally effective embodiments.

DETAILED DESCRIPTION

In an embodiment, a computer system has an attached RFID (Radio Frequency Identification) tag. The RFID tag includes tag memory and an antenna. In an embodiment, the computer system sends service data to the RFID tag. An RF scanner receives the service data from the RFID tag while the computer system is powered off and optionally sends the service data to a server. In another embodiment, an RF (Radio Frequency) transmitter sends service data to the RFID tag while the computer system is powered off, and the computer system later receives the service data from the RFID tag. In various embodiments, the service data identifies the computer system or a product within the computer system. In another embodiment, the service data includes log information associated with the computer system. In this way, in an embodiment, service data associated with a computer system, such as vital product data and log information may be accessed and updated regardless of the IPL (Initial Program Load) state of the computer system.

Figure 1:
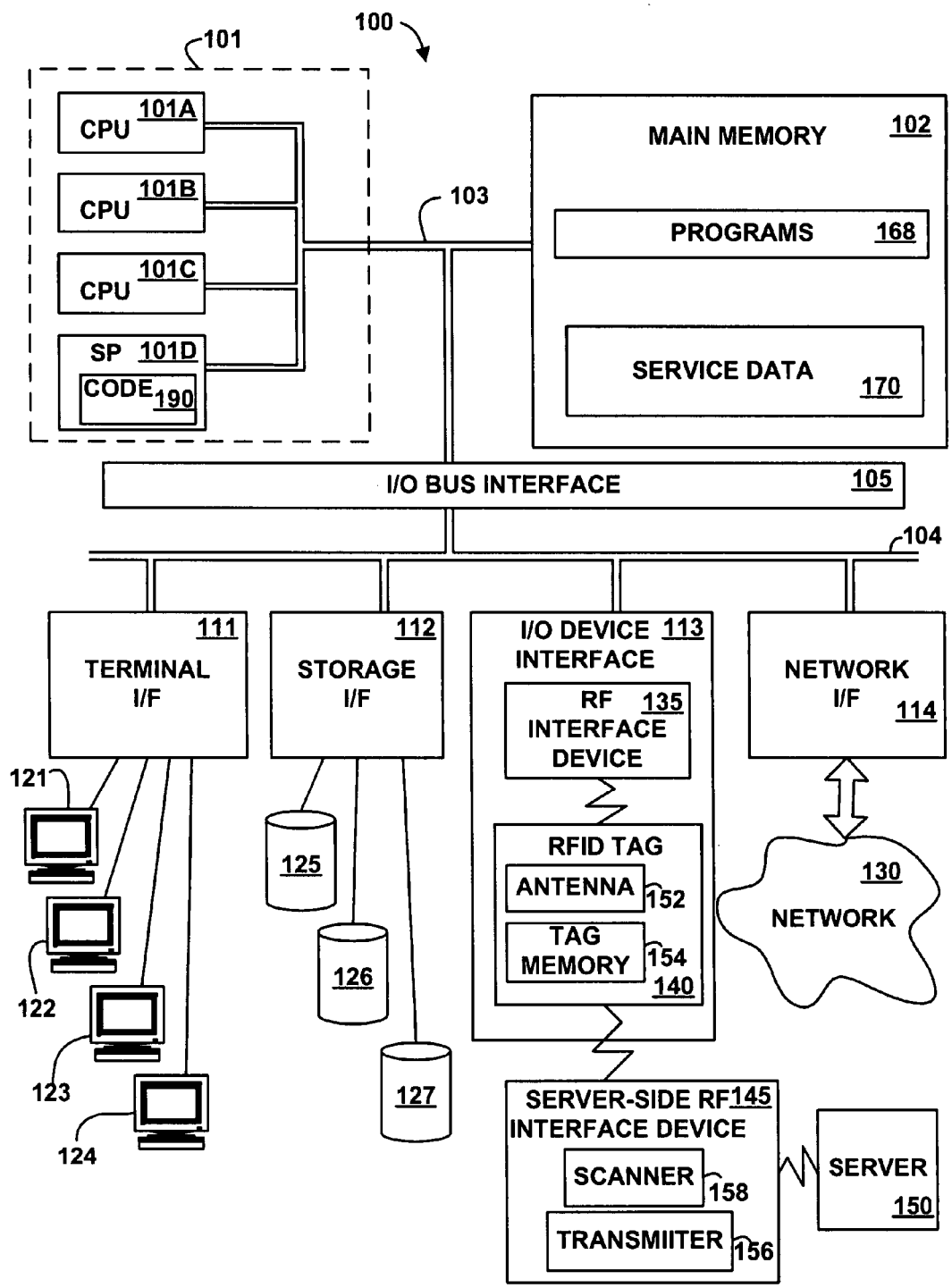
FIG. 1 depicts a high-level block diagram of an example system for implementing an embodiment of the invention.

Referring to the Drawings, wherein like numbers denote like parts throughout the several views, FIG. 1 depicts a high-level block diagram representation of a client computer system 100 connected to a network 130 and communicatively connected to a server-side RF interface device 145, which is communicatively connected to a server 150, according to an embodiment of the present invention. The terms "client" and "server" are used for convenience only, and in other embodiments an electronic device that is used as a server in one scenario may be used as a client in another scenario, and vice versa. In an embodiment, the hardware components of the computer system 100 may be implemented by an enhanced eServer iSeries computer system available from International Business Machines of Armonk, N.Y. But, those skilled in the art will appreciate that the mechanisms and apparatus of embodiments of the present invention apply equally to any appropriate computing system.

The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The processor 101D may be a service processor, which is an auxiliary processor that monitors the environment and health of one or more main processors and their associated subsystems. The service processor 101D includes control code 190. The control code 190 includes instructions capable of executing on the service processor 101D or statements capable of being interpreted by instructions executing on the service processor 101D to perform the functions as further described below with reference to FIGS. 2B, 2C, 3B, 3C, 4B, and/or 4C. In another embodiment, the control code 190 may be implemented in microcode. In another embodiment, the control code 190 may be implemented in hardware via logic gates and/or other appropriate hardware techniques in lieu of or in addition to a processor-based system. Although the control code 190 is illustrated as being contained within the service processor 101D, in another embodiment, the control code 190 may be stored in the main memory 102 and fetched by the service processor 101D as needed.

The main memory 102 is a random-access semiconductor memory for storing data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, the main memory 102 may exist in multiple levels of caches, and these caches may be further divided by function, so that one cache holds instructions while another holds non-instruction data, which is used by the processor or processors. The main memory 102 may be further distributed and associated with different CPUs or sets of CPUs, as is known in any of various so-called non-uniform memory access (NUMA) computer architectures.

The main memory 102 includes programs 168 and service data 170. Although the programs 168 and the service data 170 are illustrated as being contained within the main memory 102 in the computer system 100, in other embodiments the service data 170 may be on a different computer system and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the programs 168 and the service data 170 are illustrated as being contained within the main memory 102, the programs 168 and the service data 170 are not necessarily all completely contained in the same storage device at the same time. Further, although the programs 168 and the service data 170 are illustrated as being a single entity, in another embodiment, some of them, or some portion of them may be packaged separately.

The programs 168 may include operating systems, user programs, and/or third party programs that include instructions capable of executing on the processor 101. The service data 170 may include VPD (vital product data) and log information.

Vital product data is information that identifies the computer system 100 or a product of the computer system 100. In various embodiments, a product may be a device, a part, a resource, a service, any other hardware, software, or any portion of combination thereof, of the computer system 100. Examples of products include the processors 101, the main memory 102, the terminal interface 111, the storage interface 112, the I/O (Input/Output) device interface 113, the communications/network interfaces 114, the memory bus 103, then I/O bus 104, the I/O bus interface unit 105, the terminals 121, 122, 123, and 124, the disk drives 125, 126, and 127, and the programs 168. In various embodiments, vital product data may include a product model number, a unique serial number, a product release level, a product maintenance level, and/or other information specific to the device type of the product.

Log information may include error logs, trace logs, transaction history logs, or any other information helpful for diagnosing problems or servicing the computer system 100 or any product of the computer system 100.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI bus, or any other appropriate bus technology.

The I/O interface units support communication with a variety of storage and I/O devices. For example, the terminal interface unit 111 supports the attachment of one or more user terminals 121, 122, 123, and 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127, as needed.

The I/O device interface 113 provides an interface to any of various other input/output devices or devices of other types. The I/O device interface 113 includes an RF interface device 135 and an RFID (Radio Frequency Identification) tag 140. In various embodiments, the RF interface device 135 may be a RF transmitter, an RF receiver (scanner), an RF transceiver, or any portion or combination thereof, capable of communicating wirelessly to the RFID tag 140.

In an embodiment, the RFID tag 140 is disposed on the I/O device interface 113, which is implemented via a card. In another embodiment, the RFID tag 140 is disposed on a chip. Although the RFID tag 140 is illustrated as being part of the I/O device interface 113, in another embodiment the RFID tag 140 may be implemented separately from the I/O device interface 133; for example, the RFID tag 140 may be affixed to a cabinet or housing that houses the computer system 100, as further described below with reference to FIG. 5.

The RFID tag 140 includes an antenna 152 capable of communicating via wireless RF signals to the RF interface device 135 and the server-side RF interface device 145. The RFID tag 140 further includes a tag memory 154 capable of receiving the service data 170 from the antenna 152, storing the service data 170, and sending the service data 170 to the antenna 152. The tag memory 154 is non-volatile, meaning that it is capable of maintaining its contents in the absence of power. Examples of non-volatile memory include Flash memory, EEPROM (Electrically Erasable, Programmable Read Only Memory), FRAM (Ferroelectric RAM), and MRAM (Magnetic RAM), but in other embodiments any appropriate type of non-volatile memory may be used.

In response to the antenna 152 in the RFID tag 140 receiving a radio signal from the RF interface device 135 or the server-side RF interface device 145, the antenna 152 receives the contents of the tag memory 154 and wirelessly transmits the contents. In another embodiment, in response to the antenna 152 receiving a radio signal from the RF interface device 135 or the server-side RF interface device 145, the antenna 152 sends the contents of the radio signal to the tag memory 154, which stores the contents.

In various embodiments, the RFID tag 140 may be either active or passive. A passive RFID tag has no internal power supply. Instead, the electrical current induced in the RFID antenna 152 by the incoming radio frequency signal from the RF interface device 135 or the server-side RF interface device 145 provides enough power for the RFID tag 140 to transmit the contents of the tag memory 154 or store the contents of the incoming signal in the tag memory 154. In contrast, an active RFID tag has an internal power source, such as a battery. Thus, whether active or passive, the RFID tag 140 is capable of storing, sending, and/or receiving information to and/or from the tag memory 154 via the antenna 152 while the computer system 100 and/or the service processor 101D are powered off and/or otherwise not operating.

The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol).

In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network.

In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number (including zero) of networks (of the same or different types) may be present.

In various embodiments, the server-side RF interface device 145 may include an RF transmitter 156, an RF scanner (receiver) 158, an RF transceiver (a transmitter and a scanner), or any portion or combination thereof, capable of communicating wirelessly to the RFID (Radio Frequency Identification) tag 140 and the server 150. Although the server-side RF interface device 145 is illustrated as communicating to the server 150 via a wireless signal, in another embodiment, the server-side RF interface device 145 is connected to the server 150 via a hard wire.

The server 150 may include some or all of the hardware components already described for the computer system 100. In another embodiment, the server 150 is optional, not present, or not used.

It should be understood that FIG. 1 is intended to depict the representative major components of the computer system 100, the network 130, the server-side RF interface device 145, and the server 150 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements comprising the various aspects of an embodiment of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be stored in, encoded on, and delivered to the computer system 100 via a variety of tangible signal-bearing media, which include, but are not limited to the following computer-readable media:

(1) information permanently stored on a non-rewriteable storage medium, e.g., a read-only memory or storage device attached to or within a computer system, such as a CD-ROM, DVD-R, or DVD+R;

(2) alterable information stored on a rewriteable storage medium, e.g., a hard disk drive (e.g., the DASD 125, 126, or 127), CD-RW, DVD-RW, DVD+RW, DVD-RAM, or diskette; or (3) information conveyed by a communications or transmission medium, such as through a computer or a telephone network, e.g., the network 130.

Such tangible signal-bearing media, when carrying or encoded with computer-readable, processor-readable, or machine-readable instructions or statements that direct or control the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2A:
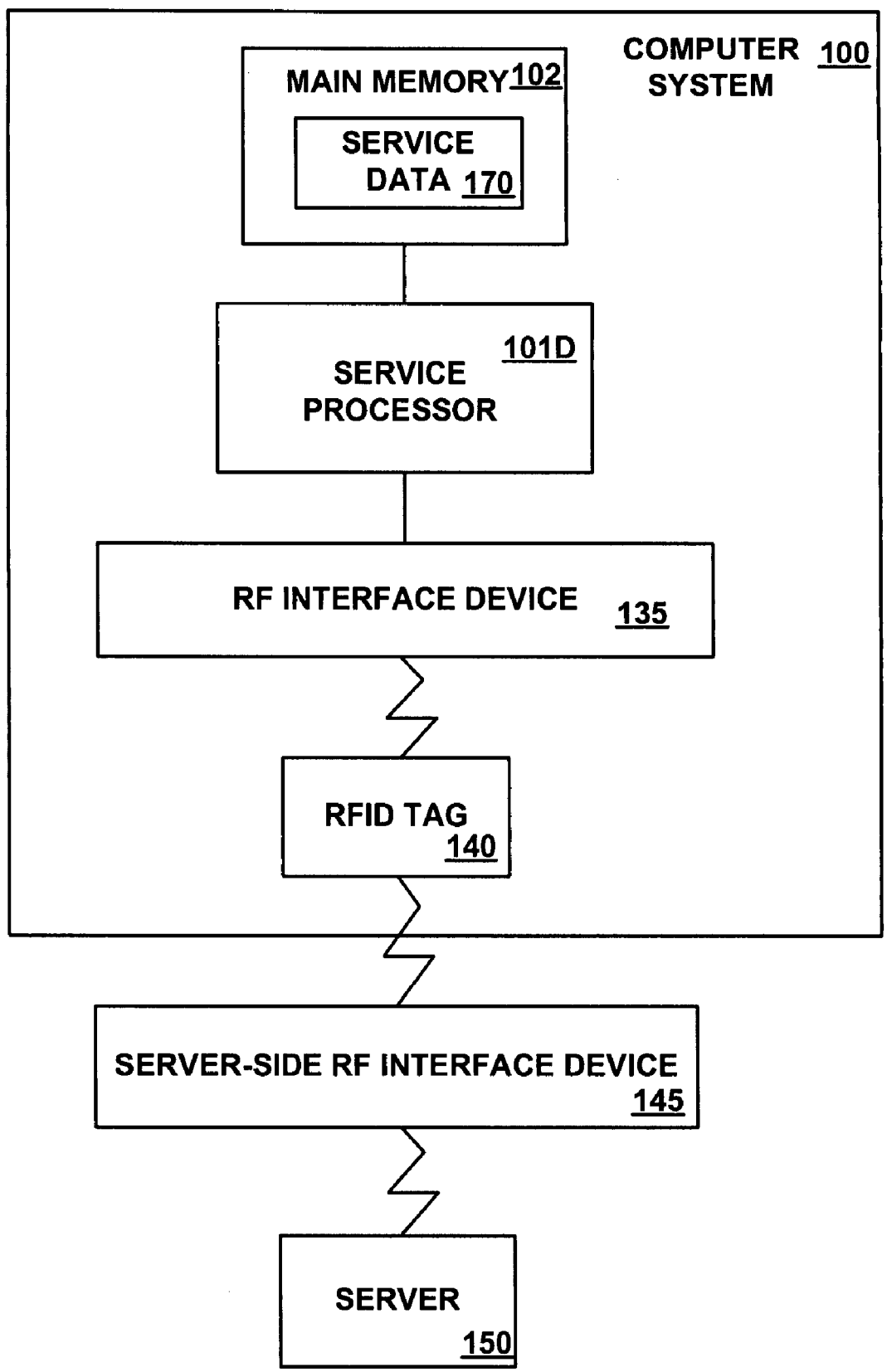
FIG. 2A depicts a block diagram of a selected components of the example system, according to an embodiment of the invention.

FIG. 2A depicts a block diagram of a selected components of the example system, according to an embodiment of the invention. The server-side RF interface device 145 is communicatively connected to the computer system 100 and the (optional) server 150 via wireless signals. The computer system 100 includes the main memory 102, which includes the service data 170, connected to the service processor 101D, which is connected to the RF interface device 135, which is communicatively connected to the RFID tag 140 via wireless signals, which is communicatively connected to the server-side RF interface device 145 via wireless signals.

Figure 2B:
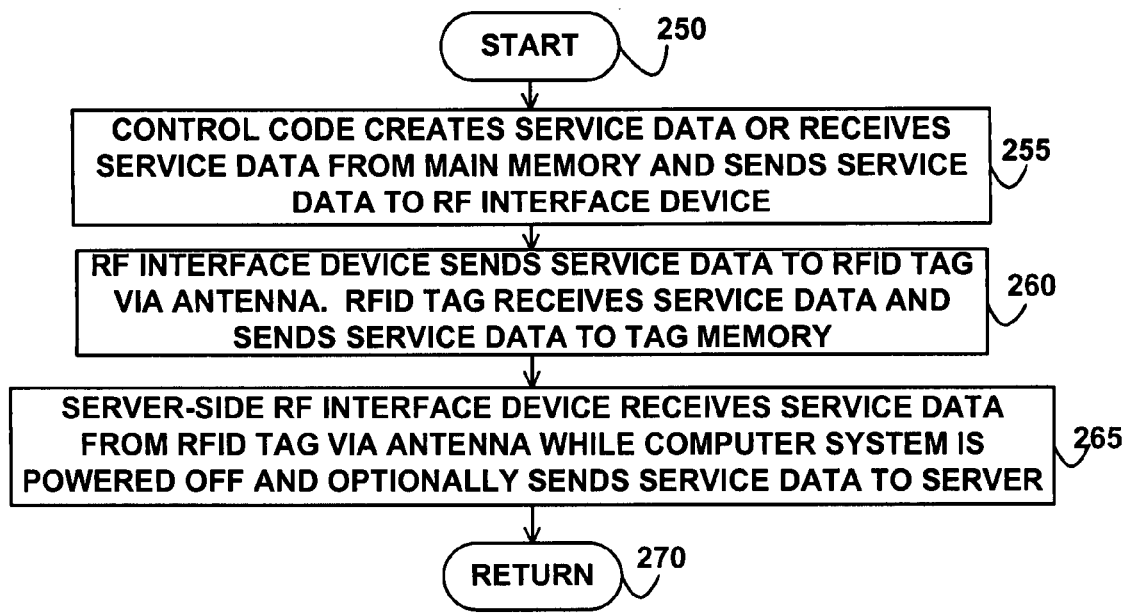
FIG. 2B depicts a flowchart of example processing for retrieving service data from a computer system via an RFID tag, according to an embodiment of the invention.

FIG. 2B depicts a flowchart of example processing for retrieving data from the computer system 100 via the RFID tag 140, according to an embodiment of the invention as illustrated in FIGS. 1 and 2A. Control begins at block 250.

Control then continues to block 255 where the control code 190 optionally creates or updates the service data 170 or receives previously created or updated service data 170 from the main memory 102. The control code 190 may create or update the data in response to the installation, change, or upgrade of a product of the computer system 100 or in response to any appropriate stimulus. The control code 190 then sends the service data 170 to the RF interface device 135 via the memory bus 103, the I/O bus 104, and the I/O bus interface unit 105. The processing described at block 250 occurs while the computer system 100, the main memory 102, and the service processor 101D are powered on and operating.

Control then continues to block 260 where the RF interface device 135 sends the service data 170 to the RFID tag 140.

The RFID tag 140 receives the service data 170 via the antenna 152, and the antenna 152 sends the service data 170 to the tag memory 154. The tag memory 154 receives the service data 170 from the antenna 152 and stores the received service data 170 in the tag memory 154.

Control then continues to block 265 where the server-side RF interface device 145 sends an RF wireless signal to the RFID tag 140. The antenna 152 at the RFID tag 140 receives the RF wireless signal, and in response, the tag memory 154 sends the service data 170 to the antenna 152, which receives the service data 170 from the tag memory 154 and sends the service data 170 via a wireless signal to the server-side RF interface device 145. The server-side RF interface device 145 receives the service data 170 from the antenna 152 in the RFID tag 140 and optionally sends the service data 170 to the server 150. Some or all of the processing described at block 265 may occur while the computer system 100, the main memory 102, and/or the service processor 101D may be powered off or not operating.

Control then continues to block 270 where the logic of FIG. 2B returns.

Figure 2C:
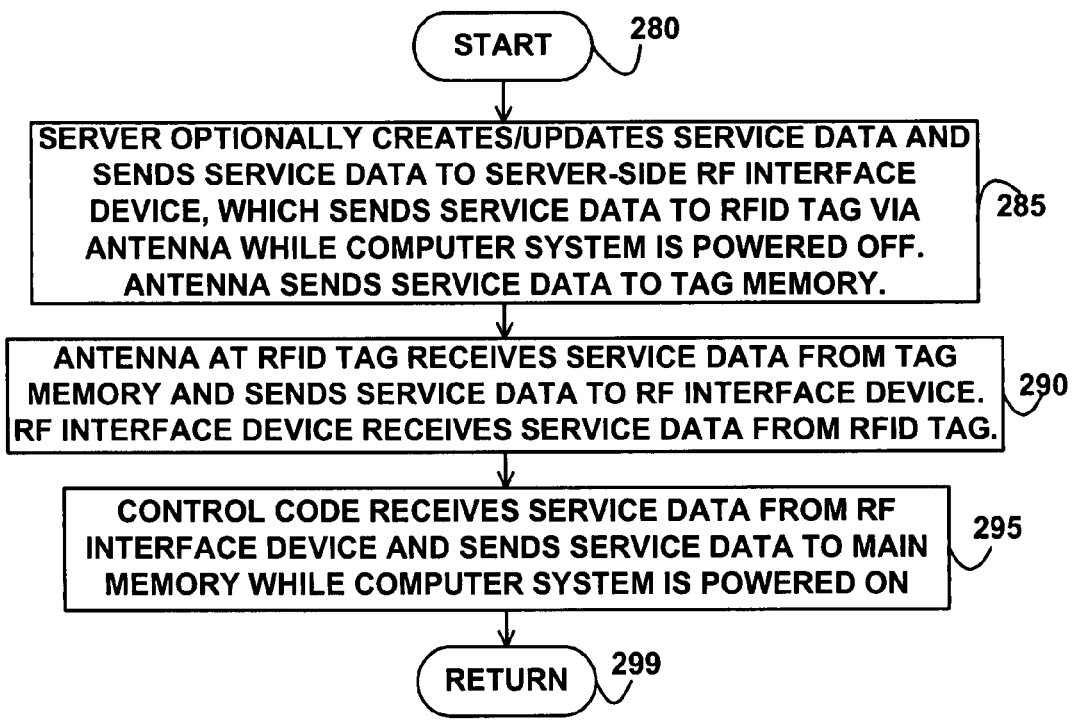
FIG. 2C depicts a flowchart of example processing for sending service data to a computer system via an RFID tag, according to an embodiment of the invention.

FIG. 2C depicts a flowchart of example processing for sending service data 170 to the computer system 100 via the RFID tag 140, according to an embodiment of the invention as illustrated in FIGS. 1 and 2A. Control begins at block 280.

Control then continues to block 285 where the server 150 optionally creates or updates the service data 170. The server 150 may create or update the service data 170 in response to the manufacture, installation, change, or upgrade of the computer system 100 or a product of the computer system 100 or in response to any appropriate stimulus. The server 150 then sends the service data 170 to the server-side RF interface device 145, which sends the service data 170 to the RFID tag 140. The antenna 152 receives the service data 170 via wireless RF signals from the server-side RF interface device 145 and sends the received service data 170 to the tag memory 154. The tag memory 154 receives the service data 170 from the antenna 152 and stores the service data 170 in the tag memory 154. Some or all of the processing described at block 285 may occur while the computer system 100, the main memory 102, and/or the service processor 101D may be powered off or not operating.

Control then continues to block 290 where the RF interface device 135 sends a wireless signal to the antenna 152 at the RFID tag 140. In response to the wireless signal, the tag memory 154 sends the service data 170 to the antenna 152, and the antenna 152 receives the service data 170 from the tag memory 154 and sends the service data 170 to the RF interface device 135 via RF wireless signal. The RF interface device 135 receives the service data 170 from the antenna 152.

Control then continues to block 295 where the RF interface device 135 sends the service data 170 to the control code 190 at the service processor 101D via the memory bus 103, the I/O bus 104, and the I/O bus interface unit 105. The control code 190 at the service processor 101D receives the service data 170 from the RF interface device 135 and sends the service data 170 to the main memory 102, which stores the service data 170. The processing described at block 295 occurs while the computer system 100, the main memory 102, and the service processor 101D are powered on and operating.

Control then continues to block 299 where the logic of FIG. 2C returns.

Figure 3A:
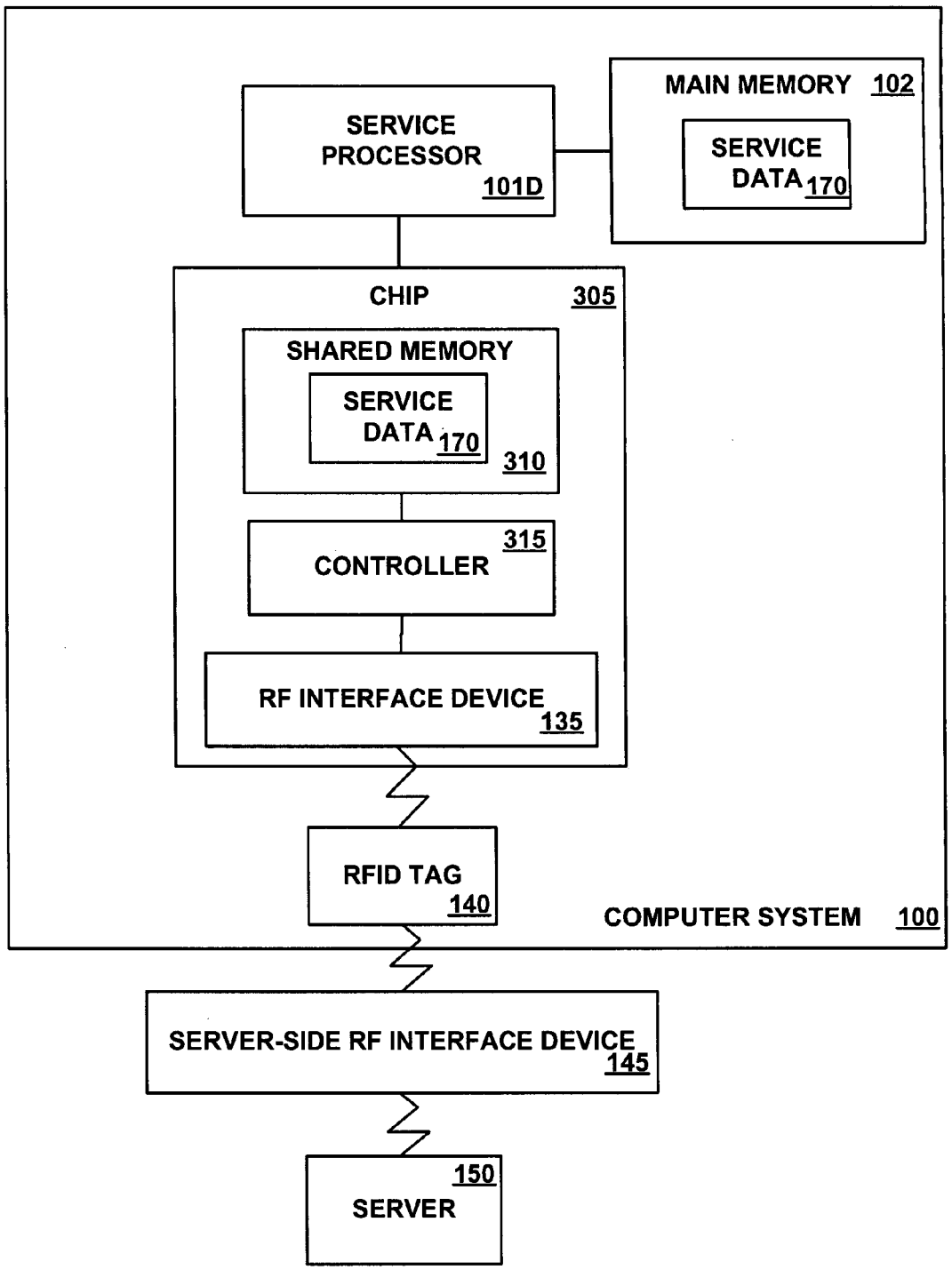
FIG. 3A depicts a block diagram of selected components of the example system, according to an embodiment of the invention.

FIG. 3A depicts a block diagram of selected components of the example system, according to an embodiment of the invention. The server-side RF interface device 145 is communicatively connected to the computer system 100 and the (optional) server 150 via wireless signals. The computer system 100 includes the main memory 102, which includes the service data 170. The main memory 102 is connected to the service processor 101D, which is connected to the chip 305, which is communicatively connected to the RFID tag 140 via wireless signals, which is commutatively connected to the server-side RF interface device 145 via wireless signals.

The chip 305 includes shared memory 310, a controller 315, and the RF interface device 135. The shared memory 310 is connected to the controller 315, which is connected to the RF interface device 135. The shared memory 310 is implemented via non-volatile memory, such as Flash memory, EEPROM (Electrically Erasable, Programmable Read Only Memory), FRAM (Ferroelectric RAM), or MRAM (Magnetic RAM), but in other embodiments any appropriate type of non-volatile memory may be used. In an embodiment, the chip 305 and the RFID tag 140 may both be present on the I/O device interface 113 (FIG. 1), but in another embodiment the chip 305 and the RFID tag 140 may be packaged separately.

Figure 3B:
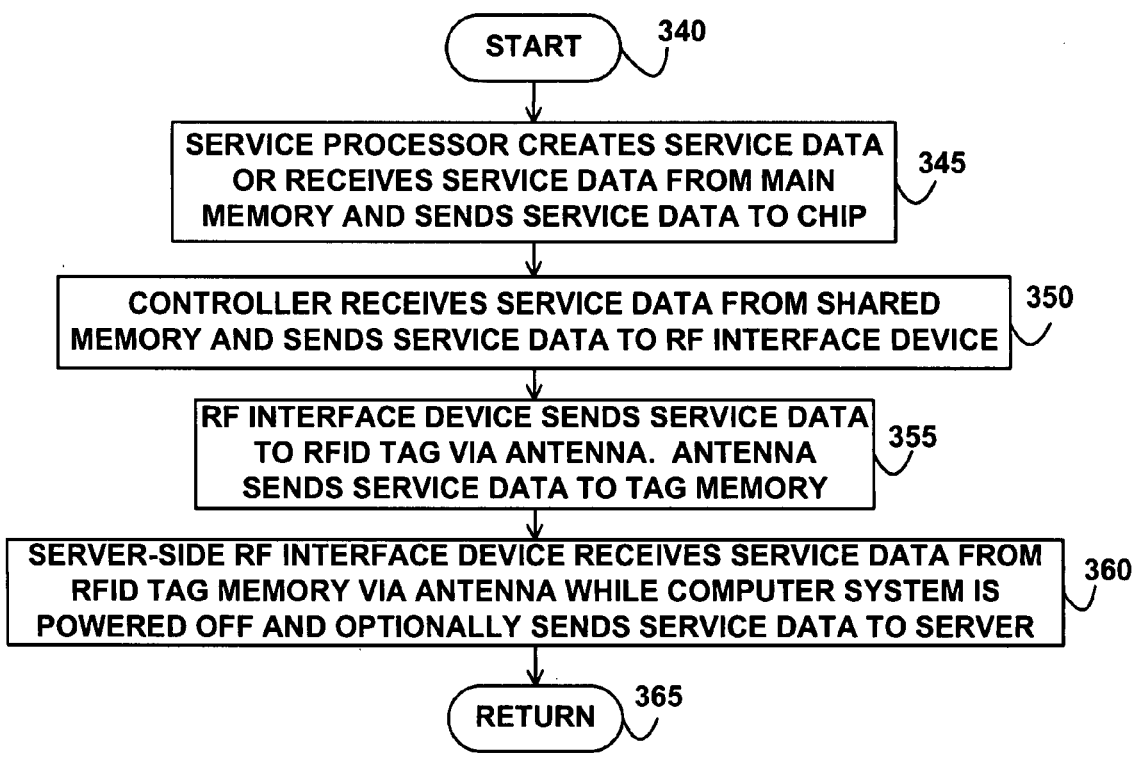
FIG. 3B depicts a flowchart of example processing for retrieving service data from a computer system via an RFID tag, according to an embodiment of the invention.

FIG. 3B depicts a flowchart of example processing for retrieving the service data 170 from a computer system 100 via the RFID tag 140, according to an embodiment of the invention as illustrated in FIGS. 1 and 3A. Control begins at block 340.

Control then continues to block 345 where the control code 190 at the service processor 101D optionally creates or updates the service data 170 or receives previously created or updated service data 170 from the main memory 102. The control code 190 may create or update the data in response to the installation, change, or upgrade of a product of the computer system 100 or in response to any appropriate stimulus. The control code 190 then sends the service data 170 to the chip 305, which stores the service data 170 in the shared memory 310.

Control then continues to block 350 where the controller 315 at the chip 305 receives the service data 170 from the shared memory 310 and sends the service data 170 to the RF interface device 135. Control then continues to block 355 where the RF interface device 135 sends the service data 170 to the RFID tag 140 via the antenna 152. The antenna receives the service data 170 and sends the data to the tag memory 154, which receives and stores the service data 170.

Control then continues to block 360 where the server-side RF interface device 145 sends a RF wireless signal to the antenna 152 at the RFID tag 140. In response to the RF wireless signal, the tag memory 154 sends the service data 170 to the antenna 152, which receives the service data 170 from the tag memory 154 and sends the service data 170 to the server-side RF interface device 145. The server-side RF interface device 145 receives the service data 170 from the antenna 152 at the RFID tag 140 and optionally sends the service data 170 to the server 150. Some or all of the processing described at block 360 may occur while the computer system 100, the main memory 102, and/or the service processor 101D may be powered off or not operating.

Control then continues to block 365 where the logic of FIG. 3B returns.

Figure 3C:
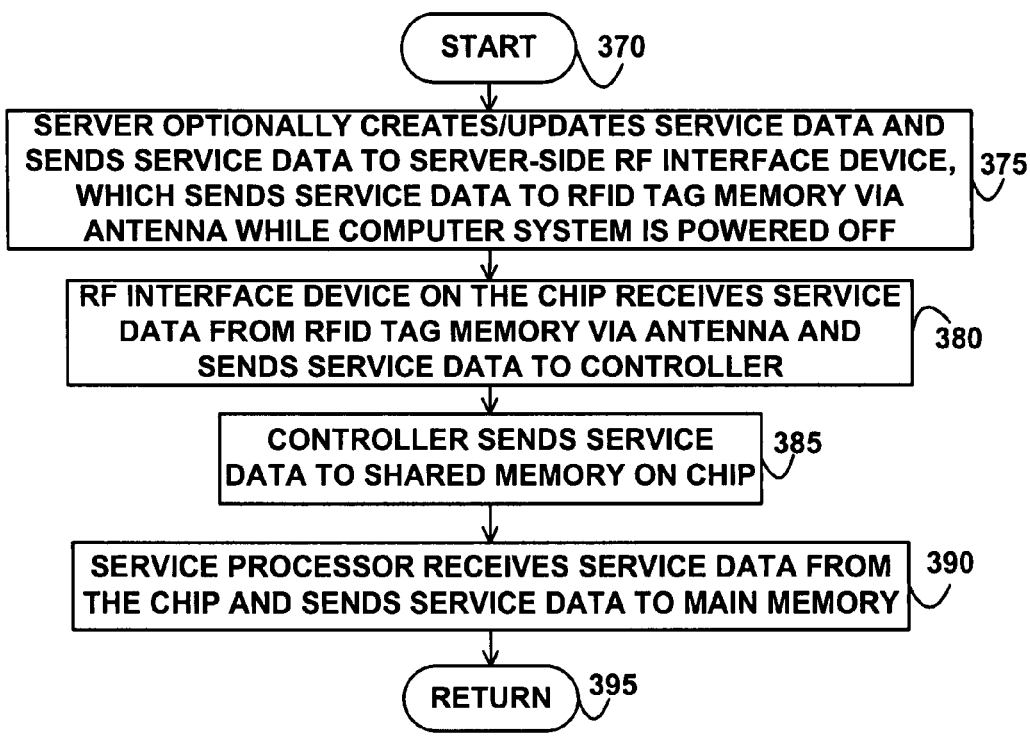
FIG. 3C depicts a flowchart of example processing for sending service data to a computer system via an RFID tag, according to an embodiment of the invention.

FIG. 3C depicts a flowchart of example processing for sending the service data 170 to the computer system 100 via the RFID tag 140, according to an embodiment of the invention as illustrated in FIGS. 1 and 3A. Control begins at block 370.

Control then continues to block 375 where the server 150 optionally creates or updates the service data 170. The server 150 may create or update the service data 170 in response to the manufacture, installation, change, or upgrade of the computer system 100 or a product of the computer system 100 or in response to any appropriate stimulus. The server then optionally sends the service data 170 to the server-side RF interface device 145, which sends the service data 170 to the RFID tag 140 via the antenna 152. The antenna 152 receives the service data 170 via wireless RF signals from the server-side RF interface device 145 and sends the received service data 170 to the tag memory 154. The tag memory 154 receives the service data 170 from the antenna 152 and stores the service data 170 in the tag memory 154. Some or all of the processing described at block 375 may occur while the computer system 100, the main memory 102, and/or the service processor 101D may be powered off or not operating.

Control then continues to block 380 where the RF interface device 135 at the chip 305 sends a wireless signal to the antenna 152 at the RFID tag 140. In response to the wireless signal, the tag memory 154 sends the service data 170 to the antenna 152, and the antenna 152 receives the service data 170 from the tag memory 154 and sends the service data 170 to the RF interface device 135 at the chip 305 via RF wireless signal. The RF interface device 135 receives the service data 170 from the antenna 152 and sends the service data 170 to the controller 315.

Control then continues to block 385 where the controller 315 sends the service data 170 to the shared memory 310 at the chip 305. Control then continues to block 390 where the control code 190 at the service processor 101D receives the service data 170 from the shared memory 310 at the chip 305 and sends the service data 170 to the main memory 102. The processing described at block 390 occurs while the computer system 100, the main memory 102, and the service processor 101D are powered on and operating.

Control then continues to block 395 where the logic of FIG. 3C returns.

Figure 4A:
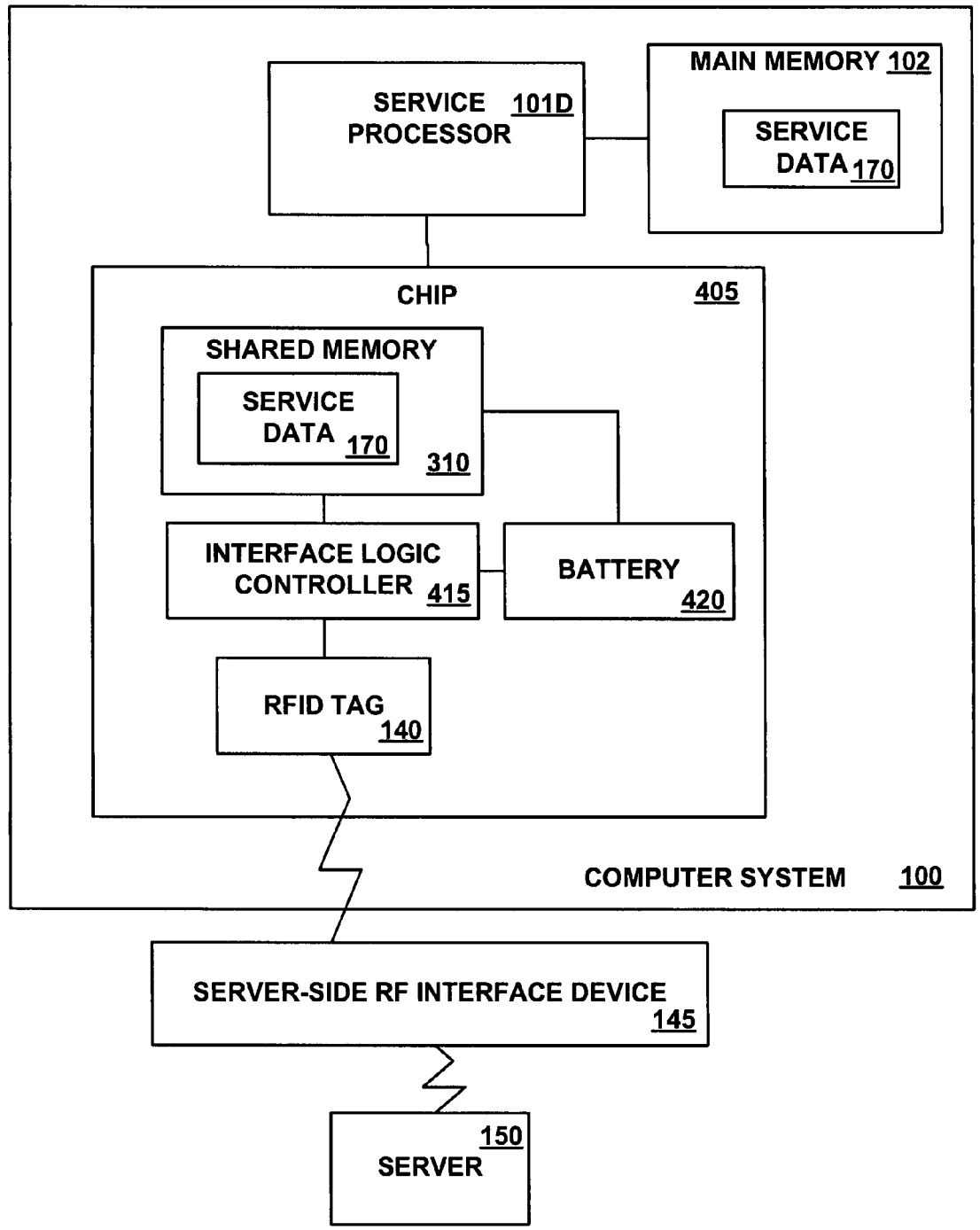
FIG. 4A depicts a block diagram of selected components of the example system, according to an embodiment of the invention.

FIG. 4A depicts a block diagram of selected components of the example system, according to an embodiment of the invention. The server-side RF interface device 145 is communicatively connected to the computer system 100 and the (optional) server 150 via wireless signals. The computer system 100 includes the main memory 102, which includes the service data 170. The main memory 102 is connected to the service processor 101D, which is connected to the chip 405, which is communicatively connected to the server-side RF interface device 145 via wireless signals.

The chip 405 includes shared memory 310, an interface logic controller 415, a battery 420, and the RFID tag 140. The shared memory 310 is connected to the interface logic controller 415, which is connected to the RFID tag 140. The battery 420 is connected to the shared memory 310 and the interface logic controller 415 and provides power to both, but in another embodiment they may have separate batteries. Because the shared memory 310 and the interface logic controller 415 have battery power, they may be operational while the service processor 101D and the main memory 102 are powered off. The shared memory 310 may be implemented via volatile memory, such as RAM (Random Access Memory), non-volatile memory, or any other appropriate type of memory. Examples of non-volatile memory include Flash memory, EEPROM (Electrically Erasable, Programmable Read Only Memory), FRAM (Ferroelectric RAM), and MRAM (Magnetic RAM). The interface logic controller 415 moves data from the shared memory 310 to the RFID tag 140, and/or vice versa. In an embodiment, the chip 405 may be present on the I/O device interface 113 (FIG. 1), but in another embodiment the chip 405 and the I/O device interface 113 may be packaged separately.

Figure 4B:
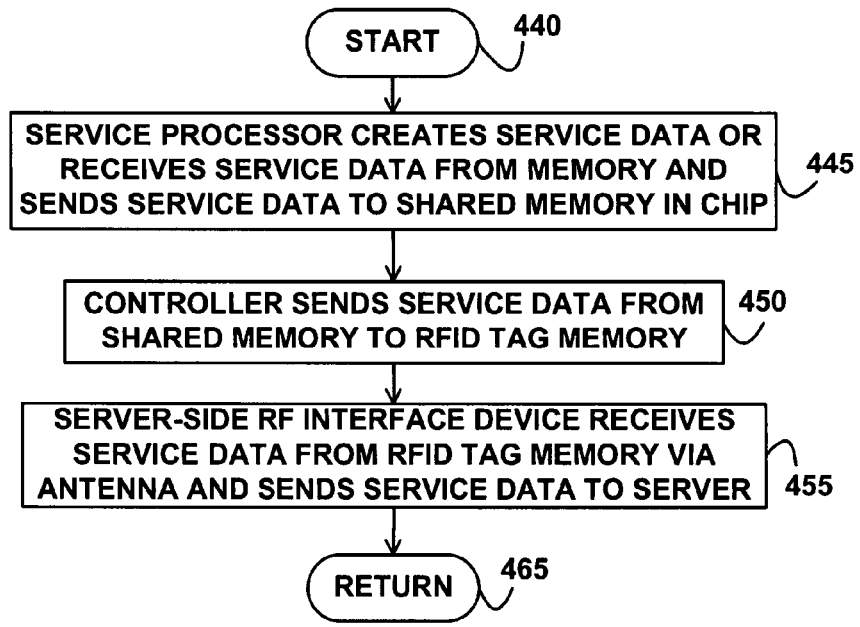
FIG. 4B depicts a flowchart of example processing for retrieving service data from a computer system via an RFID tag, according to an embodiment of the invention.

FIG. 4B depicts a flowchart of example processing for retrieving the service data 170 from the computer system 100 via the RFID tag 140, according to an embodiment of the invention as illustrated in FIGS. 1 and 4A.

Control begins at block 440. Control then continues to block 445 where the control code 190 at the service processor 101D optionally creates or updates the service data 170 or receives previously created or updated service data 170 from the main memory 102. The control code 190 may create or update the data in response to the installation, change, or upgrade of a product of the computer system 100 or in response to any appropriate stimulus. The control code 190 then sends the service data 170 to the chip 405, which stores the service data 170 in the shared memory 310.

Control then continues to block 450 where the interface logic controller 415 at the chip 405 receives the service data 170 from the shared memory 310 and sends the service data 170 to the RFID tag 140, which stores the service data 170 in the tag memory 154. Control then continues to block 455 where the server-side RF interface device 145 sends a RF wireless signal to the antenna 152 at the RFID tag 140. In response to the RF wireless signal, the tag memory 154 sends the service data 170 to the antenna 152, which receives the service data 170 from the tag memory 154 and sends the service data 170 to the server-side RF interface device 145. The server-side RF interface device 145 receives the service data 170 from the antenna 152 at the RFID tag 140 and optionally sends the service data 170 to the server 150. Some or all of the processing described at block 455 may occur while the computer system 100, the main memory 102, and/or the service processor 101D may be powered off or not operating.

Control then continues to block 465 where the logic of FIG. 4B returns.

Figure 4C:
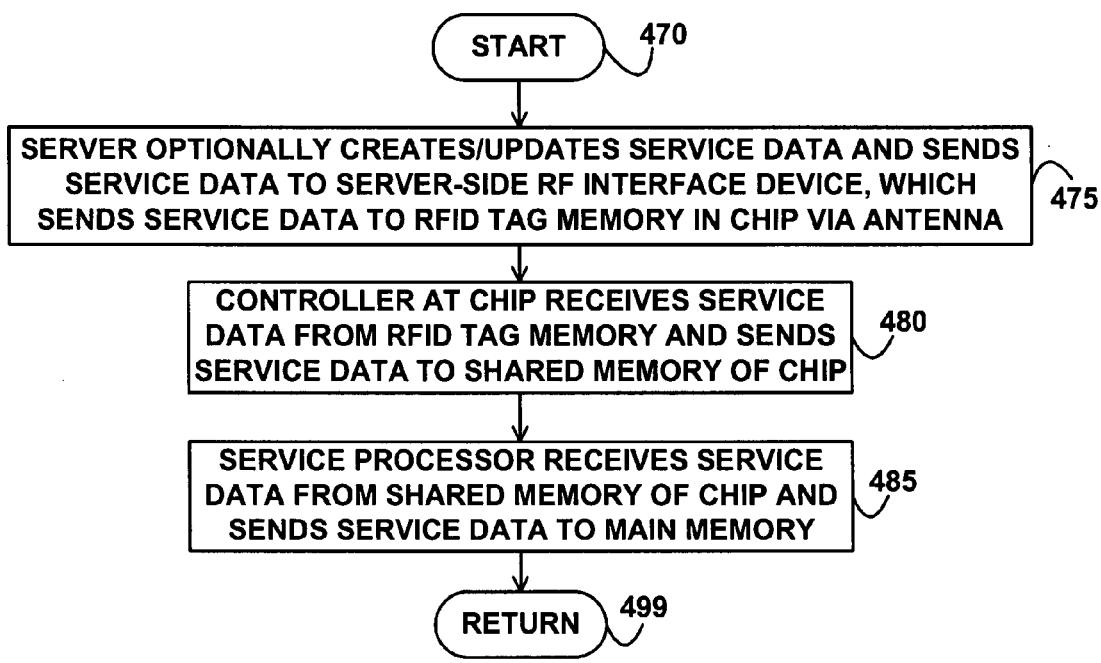
FIG. 4C depicts a flowchart of example processing for sending service data to a computer system via an RFID tag, according to an embodiment of the invention.

FIG. 4C depicts a flowchart of example processing for sending the service data 170 to the computer system 100 via the RFID tag 140, according to an embodiment of the invention as illustrated in FIGS. 1 and 4A. Control begins at block 470.

Control then continues to block 475 where the server 150 optionally creates or updates the service data 170. The server 150 may create or update the service data 170 in response to the manufacture, installation, change, or upgrade of the computer system 100 or a product of the computer system 100 or in response to any appropriate stimulus. The server 150 then optionally sends the service data 170 to the server-side RF interface device 145, which sends the service data 170 to the RFID tag 140 in the chip 405 via the antenna 152. The antenna 152 receives the service data 170 via wireless RF signals from the server-side RF interface device 145 and sends the received service data 170 to the tag memory 154. The tag memory 154 receives the service data 170 from the antenna 152 and stores the service data 170 in the tag memory 154. Some or all of the processing described at block 475 may occur while the computer system 100, the main memory 102, and/or the service processor 101D may be powered off or not operating.

Control then continues to block 480 where the interface logic controller 415 at the chip 405 receives the service data 170 from the tag memory 154 and sends the service data 170 to the shared memory 310. Control then continues to block 485 where the server processor 101D receives the service data 170 form the shared memory 310 at the chip 405 and sends the service data 170 to the main memory 102, which stores the new service data 170 or updates the previously-existing service data 170.

Control then continues to block 499 where the logic of FIG. 4C returns.

Figure 5:
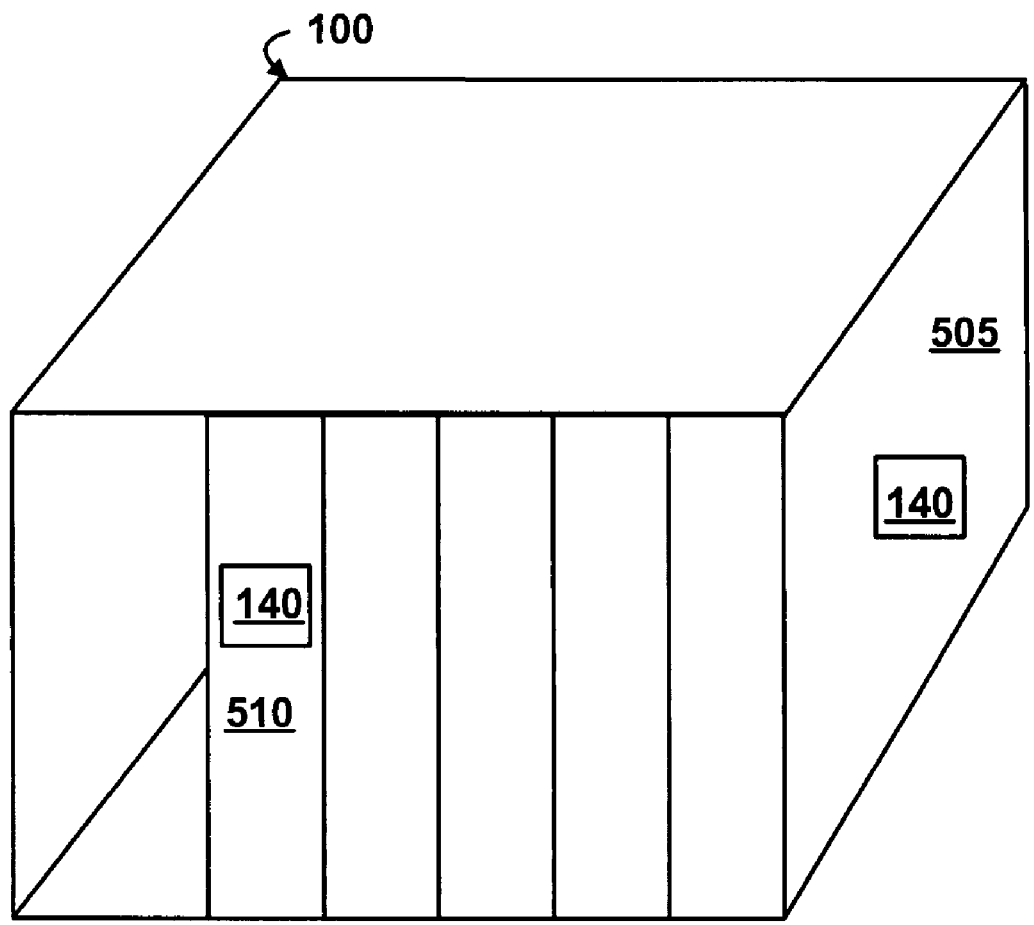
FIG. 5 depicts a block diagram of a computer system with attached RFID tags, according to an embodiment of the invention.

FIG. 5 depicts a block diagram of the computer system 100 with attached RFID tags 140, according to an embodiment of the invention. The computer system 100 includes a housing 505 and any number of products 510, to which are attached the RFID tags 140. The computer system 100 may include one RFID tag for the entire computer system 100 or any number of RFID tags associated with different products.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

What is claimed is:

1. A method for configuring a computer system, comprising:
    configuring the computer system to receive service data from an RFID tag, wherein the service data was sent to the RFID tag from a server-side RF transmitter while the computer system was powered off, wherein the RFID tag comprises tag memory and an antenna, and wherein the RFID tag is attached to the computer system; and
    configuring the computer system to send updated service data to the RFID tag in response to an upgrade of a product in the computer system, wherein the updated service data may be retrieved from the RFID tag via the antenna while the computer system is powered off, wherein the configuring the computer system to send the updated service data to the RFID tag in response to the upgrade of the product in the computer system further comprises configuring a service processor in the computer system to monitor a main processor in the computer system, create the updated service data in memory of the computer system in response to the upgrade of the product in the computer system, and send the updated service data from the memory of the computer system to the RFID tag via wireless signals in response to the upgrade of the product in the computer system while the computer system is powered on.

2. The method of claim 1, wherein the computer system wirelessly sends the updated information to the RFID tag using a local RF interface.

3. The method of claim 2, wherein the RFID tag is disposed on a card within the computer system.

4. The method of claim 2, wherein the service data identifies the computer system.

5. The method of claim 2, wherein the service data identifies a current version of the product within the computer system.

6. The method of claim 2, wherein the service data further comprises log information and Vital Product Data (VPD) associated with the computer system.

7. The method of claim 2, wherein the RFID tag is disposed on a chip within the computer system.

8. A method for presenting system service information, comprising:
    deploying a first computer system comprising an RFID tag, the first computer system having a plurality of products associated therewith;
    deploying a second computer system, the second computer system comprising a second RF interface device adapted for wireless communication with the RFID tag on the first computer system;
    configuring the first computer system to update the service information in response to an upgrade of one of the plurality of products in the first computer system, wherein the configuring the first computer system to update the service information further comprises configuring a service processor in the first computer system to monitor a main processor in the first computer system, update the service information in memory of the first computer system in response to the upgrade of the one of the plurality of products in the first computer system while the first computer system is powered on; and
    configuring the first computer system to wirelessly update service data at the RFID tag from the service information that was updated in the memory of the computer system while the first computer system is powered on, whereby the updated service data is accessible by the second computing system from the RFID tag while the first computer system is powered off.

9. The method of claim 8, wherein the service data further comprises log information associated with the computer system.

10. The method of claim 9, wherein the service information further comprises Vital Product Data (VPD).

11. The method of claim 10, wherein the upgrade comprises a new version of a software product on the first computing system.

12. The method of claim 11, further comprising configuring the RFID tag to receive service information from the second computer system while the first computer system is powered off.

13. The method of claim 12, further comprising configuring the first computer system to wirelessly receive service data from the RFID tag.

14. A method for deploying computing infrastructure, comprising
    integrating first computer readable code into a computer system that sends service data from the computer system to an RFID tag, wherein the RFID tag comprises tag memory and an antenna, wherein the RFID tag is attached to the computer system, and wherein the service data is received by an RF scanner from the RFID tag via the antenna while the computer system is powered off, wherein the computer system comprises a service processor, a main processor, and an RF interface device, and wherein the integrating the computer readable code into the computer system that sends the service data further comprises integrating, the computer readable code into the service processor that monitors the main processor, creates the service data in memory of the computer system in response a change of a product in the computer system while the computer system is powered on and sends the service data from the RF interface device via wireless signals to the antenna while the computer system is powered on, in response to the change of the product in the computer system, wherein the change to the product comprises an upgrade to a new version of the product in the computer system; and integrating second computer readable code into an RF transmitter that sends new service data from the RF transmitter to the RFID tag while the computer system is powered off, wherein the computer system receives the new service data from the RFID tag via the RF interface device while the computer system is powered on.

15. The method for deploying computing infrastructure of claim 14, wherein the RFID tag is disposed on a chip within the computer system.

16. The method for deploying computing infrastructure of claim 14, wherein the RFID tag is disposed on a card within the computer system.

17. The method for deploying computing infrastructure of claim 14, wherein the service data identifies the computer system.

18. The method for deploying computing infrastructure of claim 14, wherein the service data identifies the product within the computer system.

19. The method for deploying computing infrastructure of claim 14, wherein the service data comprises log information associated with the computing system.

* * * * *